United States Patent [19]

Huang

[11] Patent Number: 5,680,180
[45] Date of Patent: Oct. 21, 1997

[54] COLOR BALANCE COMPENSATION FOR DIGITAL DISPLAY SYSTEM WITH COLOR WHEEL

[75] Inventor: Austin L. Huang, Dallas, Tex.

[73] Assignee: Texas Instruments Incorporated, Dallas, Tex.

[21] Appl. No.: 437,190

[22] Filed: May 8, 1995

[51] Int. Cl.⁶ .................................. H04N 9/73; H04N 9/12
[52] U.S. Cl. .................... 348/656; 348/743; 348/760; 348/771
[58] Field of Search .................................... 348/655, 656, 348/739, 759, 760, 764, 770, 771, 742, 743; H04N 9/31, 9/73, 9/12

[56] References Cited

U.S. PATENT DOCUMENTS

| | | | |
|---|---|---|---|
| 5,079,544 | 1/1992 | DeMond et al. | 340/701 |
| 5,233,385 | 8/1993 | Sampsell | 355/35 |
| 5,442,411 | 8/1995 | Urbanus | 348/759 |
| 5,448,314 | 9/1995 | Heimbuch | 348/743 |
| 5,452,024 | 9/1995 | Sampsell | 348/755 |
| 5,526,051 | 6/1996 | Gove | 348/388 |

*Primary Examiner*—Sherrie Hsia
*Attorney, Agent, or Firm*—Julie L. Reed; James C. Kesterson; Richard L. Donaldson

[57] ABSTRACT

A method of detecting and compensating for colors displayed by a display system (10) that uses a light source (16) and a color wheel (15). A desired color balance is specified in terms of a power ratio of three primary colors. This ratio is then compared to the actual power of light filtered through each color of the color wheel. (FIGS. 2A, 2B). In a first embodiment, the filter transmission characteristics are adjusted. (FIG. 3). In a second embodiment, the size of the color wheel's segments are changed as well as the display times for data corresponding to each segment. (FIG. 4). The two embodiments can also be combined to achieve a desired color balance.

18 Claims, 2 Drawing Sheets

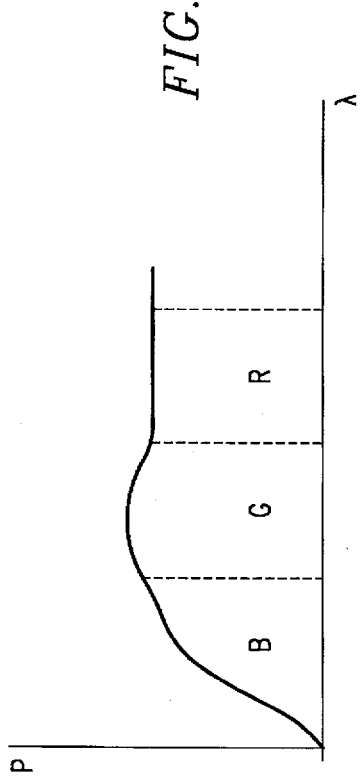
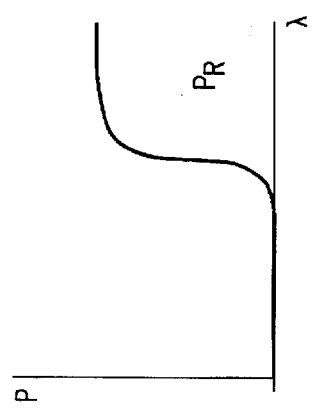
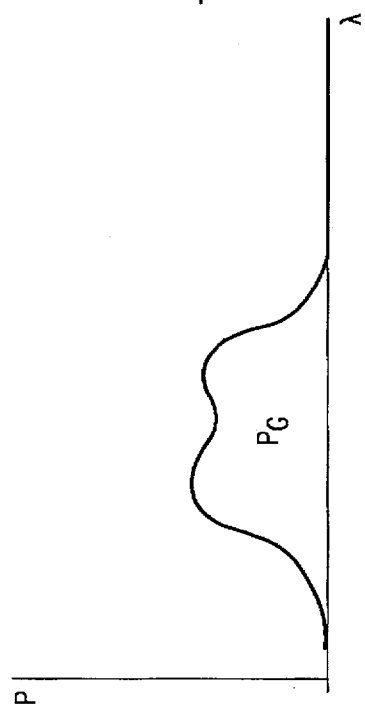
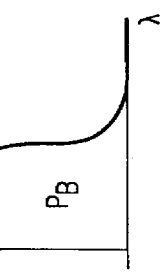
FIG. 2A
FIG. 2B
FIG. 3

COLOR BALANCE COMPENSATION FOR DIGITAL DISPLAY SYSTEM WITH COLOR WHEEL

TECHNICAL FIELD OF THE INVENTION

This invention relates to image display systems, and more particularly to digital image display systems that use a color wheel.

BACKGROUND OF THE INVENTION

Image display systems based on spatial light modulators (SLMs) are an alternative to image display systems based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of an air gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the entrance pupil of a projection lens and then to an image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, green, then blue data, alternatingly. A color wheel having three segments of these same colors is synchronized to the data so that as the data for each color is displayed by the SLM, the light incident on the SLM is filtered by the color wheel. For standard display rates, such as the 30 frame per second NTSC rate, the eye perceives the image as having the proper color.

Various modulation schemes can be used to vary the intensity of each color. For example, each pixel might have a 24-bit value, 8 bits for each color. This permits $2^8=256$ levels of intensity for each color, which includes a 0 value for no color (black). Then, for each color, the pixel can be on for a length of time for corresponding to its pixel value, and the combination of colors can provide a full color display.

For color displays, one aspect of picture quality is color balance. In an SLM system, the illumination, which is provided by the combination of a source and a color wheel, may not match the desired color balance. A method of adjusting color temperature, as indicated by the perceived quality of white light is described in U.S. patent Ser. No. 08/451,387, entitled "Color Temperature Compensation for Digital Display System with Color Wheel".

SUMMARY OF THE INVENTION

One aspect of the invention is a method of providing a desired color balance for a display generated by a light source and a color wheel. First, the desired color balance is defined in terms of a desired power ratio of colors to be provided by the color wheel. Then the color wheel is assembled with at least one filter segment for each color of the color ratio. The power of the source light for each color of the power ratio, as transmitted through all filter segments of the color wheel corresponding to that color, is measured. The measured power of each color is compared to the power of each color in the power ratio, thereby determining whether there is an out-of-balance color. If so, an adjustment is made to the filtering characteristics of the filter segment(s) of the color wheel corresponding to the out-of-balance color. These adjustments can be to the size of the filter segment, its wavelength range, or both. The assembling, measuring, comparing, and adjusting steps can be repeated until the measured powers are the same as the powers of the power ratio.

An advantage of the invention is that a light source not necessarily having the desired color balance can be used. This permits the light source to be selected on the basis of factors other than color balance, such as heat, size, cost, and total light output intensity.

BRIEF DESCRIPTION OF THE DRAWINGS

FIGS. 2A and 2B illustrate the steps of detecting a color imbalance in the system of FIG. 1 in accordance with the invention.

FIG. 3 illustrates a first method of compensating the color imbalance.

DETAILED DESCRIPTION OF THE INVENTION

Display System Overview

The following description is in terms of a display system that displays images generated by an SLM. However, the invention is not limited to SLM-based displays, and could be used with any display system that uses a color wheel for sequential color displays. For example, the data described herein could be converted to analog signal for use by a white light CRT whose images are filtered by a color wheel. Whether used digitally or converted to analog, the pixel data is "time modulated" in the sense that the display time for each color can be varied.

Figure 1:
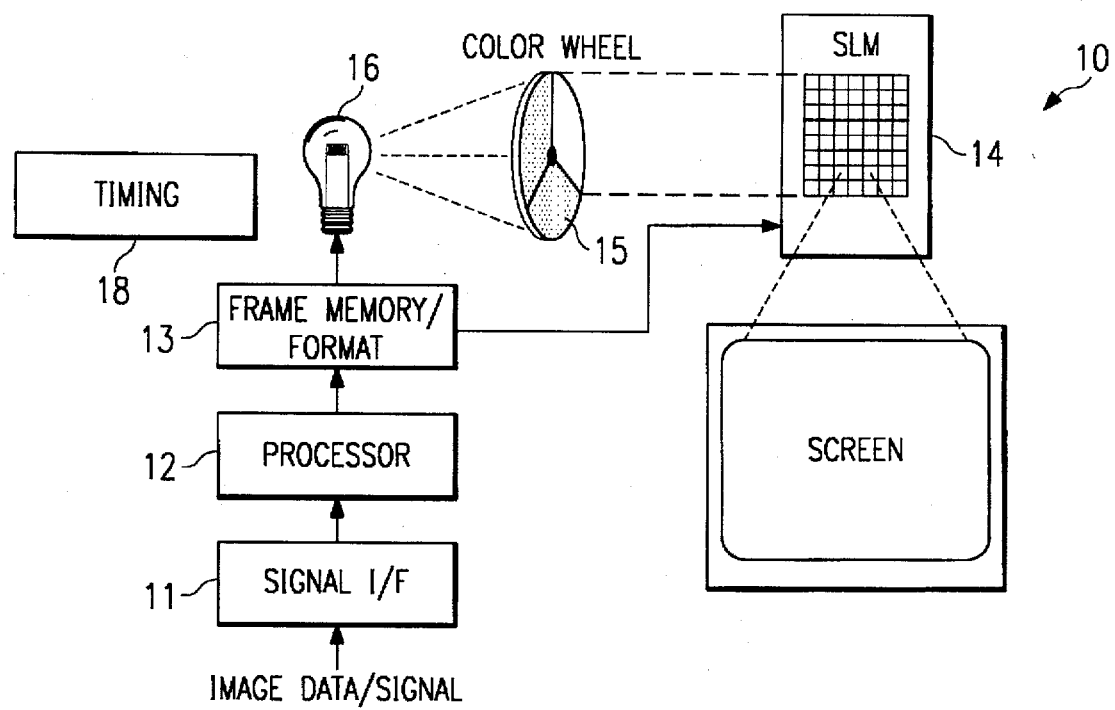
FIG. 1 is a block diagram of a display system having a color wheel configured and operated in accordance with the invention.

FIG. 1 is a block diagram of a typical SLM-based image display system 10 that uses a color wheel 15 in accordance with the invention. In the example of FIG. 1, color wheel 15 has three filter segments, one red, one green, one blue. As explained below, the invention is directed to adjusting the filtering characteristics or the size, or both, of one or more of these segments to achieve a desired color balance.

The following overview of the various components of display system 10 provides details helpful to understanding of the invention. Further details pertaining to a DMD-based image display system with other types of color wheel systems are set out in U.S. Pat. No. 5,079,544, entitled "Standard Independent Digitized Video System"; In U.S. Pat. No. 5,526,051, entitled "Digital Television System"; and in U.S. Pat. No. 5,452,024, entitled "DMD Display System". Further details describing the general operation of color wheels for SLM-based display systems are set out in U.S. Pat. No. 5,233,385, entitled "White Light Enhanced Color Field Sequential Projection"; U.S. Pat. No. 5,448,314, entitled "Method and Apparatus for Sequential Color Imaging"; and U.S. patent Ser. 08/339,373, entitled "Digital Motor Controller for Color Wheel". Each of these patents and patent applications is assigned to Texas Instruments Incorporated, and each is incorporated herein by reference.

Signal interface 11 receives some kind of input signal. For purposes of example herein, it will be assumed that the input signal is a standard analog video signal having horizontal and vertical synchronization components. However, in other systems, the input signal might be graphics data already in digital form.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 13 may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by 8 bits for each of three colors, there will be 3×8=24 bit-planes per frame. Bit-planes containing less significant bits will result in shorter display times than the bit-planes containing more significant bits.

In a typical display system 10, memory 13 is a double-buffer memory, which means that it has a capacity for at least two display frames. The buffer for one display frame can be read out to SLM 14 while the buffer or another display frame is being written. The two buffers are controlled in a "ping-pong" manner so that data is continuously available to SLM 14.

SLM 14 may be any type of SLM. For purposes of example, this description is in terms of a display system whose SLM is a digital micro-mirror device (DMD). However, as stated above, the same concepts apply to display systems that use other types of SLMs or other image generating devices.

Light incident on SLM 14 is provided by a light source 16 and is transmitted through a rotating color wheel 15. In the system of FIG. 1, SLM 14 is a reflective SLM (a DMD), and the color wheel 15 is used to filter the light before reflection. As an alternative, the color wheel 15 could be placed so that light is filtered after being emitted or reflected.

As explained in the Background, the data for each color are sequenced and the display of the data is synchronized so that the portion of color wheel 15 through which light is being transmitted to SLM 14 corresponds to the data being displayed. In the example of this description, each pixel is represented by an RGB data value, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 includes a motor, controlled by a motor controller that controls the speed and phase of color wheel 15. For example, the desired speed might be 60 revolutions per second to correspond to a 60 frame per second display rate. The phase is set so that the proper filter (red, green, or blue) of color wheel 15 is transmitting light from SLM 14 as the data for that filter is being displayed. To maintain a correct phase relationship between the color wheel 15 and the data being displayed, the color wheel 15 can speed up or slow down or the data can be delayed or skipped.

As explained above, for a DMD-based system, the data delivered to SLM 14 is in a special bit-plane format for pulse width modulation. Each red, green, and blue value of a pixel has n bits per frame. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

Where a frame of data is displayed for a frame period of T seconds, color wheel 15 has a period of revolution of T seconds. If each color were to be displayed for an equal time, the color wheel 15 would have equally sized segments of each color and the data for each color would then be displayed for T/3 seconds. The LSB period would be the frame time for each color divided by the number of LSB periods for that color. Thus, where all colors are treated the same, and where there are n bits per color, the LSB period would be calculated as follows:

$$\frac{T}{3(2^n-1)} \text{ seconds.}$$

For a 60 frame per second display, the frame period is approximately 16.7 milliseconds. For pixel data having 8 bits per color, each LSB time is 16.7 msec/3*255 or 21.8 microseconds, using approximate time values.

Master timing unit 18 provides various system control functions. One timing signal provided by master timing unit 18 is a signal defining the display times for each bit weight of the pixel value.

Although not illustrated in FIG. 1, system 10 also includes a projection lens and various other optical devices for collecting and projecting the image from SLM 14 to the image plane (screen).

Color Balance Compensation

Figure 4:
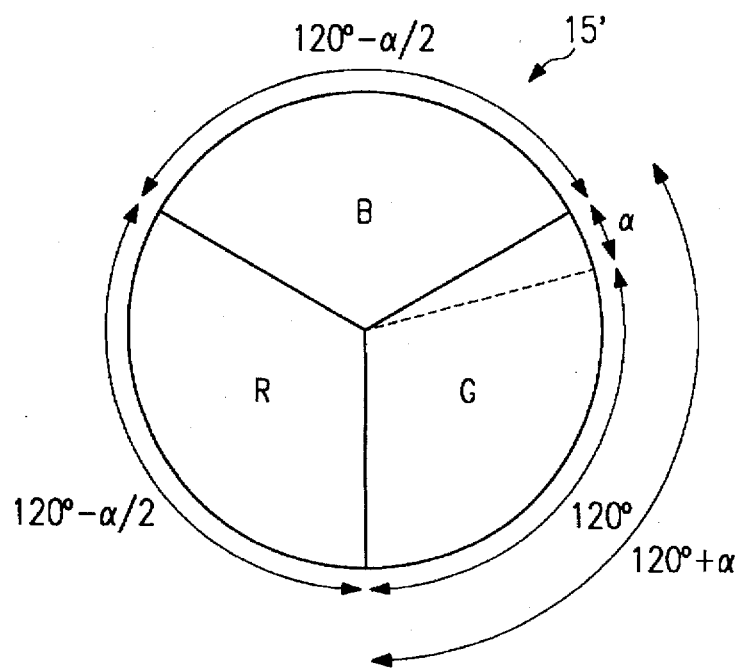
FIG. 4 illustrates a second method of compensating the color imbalance.

FIGS. 2A–2B illustrate the steps of detecting color imbalance in light transmitted from light source 16 through color wheel 15. FIGS. 3 and 4 illustrate two methods of compensating the imbalance. For purposes of example, a light source 16 having a green deficiency is assumed.

First, a desired color balance is specified in terms of a ratio of power of a number of different colors. For purposes of example, the ratio is in terms of the three primary colors: red, green, and blue. Thus, the desired power ratio has the form:

$$P_{blue}:P_{green}:P_{red}$$

Appropriate values can be determined in accordance with known standards. One such standard is the ISO/CIE Standard for Colormetric Illuminance, 1991. Other primaries could be used, with color being specified in terms of amounts of each primary.

FIG. 2A illustrates the source illumination, having a certain spectrum, with intensity as a function of wavelength. Each color has a range of wavelengths.

As shown in FIG. 2B, the effect of color wheel 15 on the source illumination is analyzed to determine an actual power ratio. This power ratio is determined by measuring the light through each filter of color wheel with a photometer. Typically, the color wheel 15 is initially provided with filter segments for each of three primary colors. In the example of this description, color wheel 15 has three equally sized filter segments, one red, one blue, one green.

The result of the power measurements is an actual power value for the light transmitted through each filter, $P'_{blue}$, $P'_{red}$, and $P'_{green}$. These actual power values are compared to the desired power ratio. If any color is deficient or excessive, it is considered out-of-balance, and the corresponding filter of color wheel 15 is adjusted.

As illustrated in FIG. 3, one adjustment to the color wheel can be accomplished by adjusting the transmission characteristics of the filters of color wheel 15. Specifically, one or more filter edges are moved, so that the filter includes a greater or smaller range of wavelengths. The adjustments are to the filter edges in the visible range. In the example of this description, where the green power is deficient, the green filter bandwidth is expanded in both directions. For a blue deficiency, the right edge of the blue filter could be expanded toward longer wavelengths. For a red deficiency, the left edge of the red filter could be expanded to include shorter wavelengths. For color excesses, the filter edges of the excessive color may be contracted, or the filter edges of the other colors could be expanded.

A feature of the method of FIG. 3 is that fewer hues may be available. In terms of the well-known CIE color chart, the overlapping filters pull in points of the color triangle. However, the total intensity of light from source 16 is not diminished.

FIG. 4 illustrates another method of compensating for color balance in accordance with the invention. As in the example of FIG. 3, it is assumed that the green power of the desired power ratio is deficient.

As illustrated, the green segment of color wheel 15' has been enlarged. More specifically, whereas a color wheel having equally sized segments would have segments having a 120 degree arc size, the green segment of color wheel 15' has been enlarged to 120+αdegrees. The red and blue segments have been decreased in size to 120–α/2 degrees.

Consistent with the enlargement of the green segment, the time during which green data is displayed is increased. The increase is proportionate to the increase in the size of the green segment. The time during which red and blue data is displayed is decreased, proportional to the decrease in the size of the red and blue segments.

The green display time is calculated as follows:

$$\frac{T}{3} + \frac{\alpha T}{360} \text{ seconds,}$$

where alpha is the number of degrees that the green segment has been increased. The red and blue display times are calculated as follows:

$$\frac{T}{3} - \frac{\alpha/2\, T}{360} \text{ seconds.}$$

The increase and decrease of display times can be achieved by adjusting the LSB period (each time slice). Because each bit-plane then has a longer display time, this evenly spreads the change for each color throughout the display time for that color. However, other approaches are possible, such as changing the display times for only the bit-planes of more significant bits.

Where the LSB period is to be adjusted, the increase for the LSB period of green data can be calculated as follows:

$$\frac{\alpha T}{360\,(2^n-1)} \text{ seconds.}$$

It directly follows that the LSB period for the green data is:

$$\frac{T}{3\,(2^n-1)} + \frac{\alpha T}{360\,(2^n-1)} \text{ seconds.}$$

For red and blue data, the decrease for the LSB time is ½ the increase for the LSB time of green data. Their LSB periods are calculated as:

$$\frac{T}{3\,(2^n-1)} - \frac{\alpha/2\, T}{360\,(2^n-1)} \text{ seconds.}$$

A feature of the method of FIG. 4 is that the available colorspace is not affected. However, the total intensity during any one revolution of color wheel 15 will be affected by varying the relative size of the segments.

A combination of the method of FIG. 3 and the method of FIG. 4 could also be used to achieve a desired color balance. In other words, the size of one or more of the filter segments of color wheel 15 could be increased or decreased, with a corresponding change in the display time for that segment. The filter characteristics of that segment or another segment of the same color wheel 15 could also be adjusted. This combination of methods could be used to optimize the advantages and minimize any disadvantages of the two methods.

For either the method of FIG. 3 or of FIG. 4, it is possible that the color wheel might have its red, green, and blue segments in interleaved sections instead of contiguous segments. U.S. Pat. No. 5,448,371, incorporated by reference above, describes this technique as a method of reducing artifacts. For the method of FIG. 3, the filter characteristics of one or more segments is adjusted. For the method of FIG. 4, increases and decreases in segment sizes and display times are allocated among the segments.

Finally, it is possible that the color wheel might have less than or more than three colors. Or the color wheel might have a white segment as described in U.S. Pat. No. 5,233,385, incorporated by reference above. The concepts described above would apply with appropriate modifications to account for the portion of the color wheel allocated to each color.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing a desired color balance for a display generated by source light filtered through a color wheel, comprising the steps of:

specifying a desired power ratio of colors to be provided by said color wheel;

providing said color wheel with at least one filter segment for each color of said color ratio, each said filter segment having a wavelength range that permits specified wavelengths to pass;

measuring said source light for each color of said power ratio, as transmitted through all filter segments of said color wheel corresponding to said each color, thereby obtaining a power value for each color;

comparing said power value for each color to said power ratio, thereby determining an out-of-balance color;

adjusting said wavelength range of one or more filter segments of said color wheel to compensate for said out-of-balance color, such that said power values substantially match said desired power ratio.

2. The method of claim 1, wherein said power ratio is comprised of three colors.

3. The method of claim 1, wherein said out-of-balance color is deficient, and wherein said adjusting step is performed by expanding said wavelength range of one or more filter segments corresponding to said out-of-balance color.

4. The method of claim 1, wherein said out-of-balance color is deficient, and wherein said adjusting step is performed by contracting said wavelength range of one or more filter segments corresponding to a color not out-of-balance.

5. The method of claim 1, wherein said out-of-balance color is excessive, and wherein said adjusting step is performed by contracting said wavelength range of one or more filter segments corresponding to said out-of-balance color.

6. The method of claim 1, wherein said out-of-balance color is excessive, and wherein said adjusting step is performed by expanding said wavelength range of one or more filter segments corresponding to a color not out-of-balance.

7. A method of providing a desired color balance for a display generated by light filtered through a color wheel and represented by sequential pixel data for each color, said pixel data representing display times for each pixel of said display, comprising the steps of:

specifying a desired power ratio of colors to be provided by said color wheel;

providing said color wheel with at least one filter segment for each color of said color ratio;

measuring power of said source light for each color of said power ratio, as transmitted through all filter segments of said color wheel corresponding to said each color, thereby obtaining a power value for each color;

comparing said power values to said power ratio, thereby determining an out-of-balance color;

adjusting relative sizes of said filter segments of said color wheel to compensate said out-of-balance color; and adjusting the display times for said pixel data for each color by an amount of time proportional to an adjustment to said relative size of said at least one filter segment corresponding to that color.

8. The method of claim 7, wherein said pixel data is formatted in bit-planes, and wherein said step of adjusting display times is achieved by adjusting said display times for one or more bit-planes.

9. The method of claim 8, wherein said display times are adjusted by increasing or decreasing a least significant bit (LSB) period.

10. The method of claim 7, wherein said out-of-balance color is deficient and wherein said step of adjusting the relative sizes of said filter segments is performed by increasing the size of one or more filter segments corresponding to said out-of-balance color.

11. The method of claim 7, wherein said out-of-balance color is excessive and wherein said step of adjusting the relative sizes of said filter segments is performed by decreasing said size of one or more filter segments corresponding to said out-of-balance color.

12. A method of providing a desired color balance for a display generated by source light filtered through a color wheel and represented by sequential pixel data for each color, said pixel data representing display times for each pixel of said display, comprising the steps of:

specifying a desired power ratio of colors to be provided by said color wheel;

providing said color wheel with at least one filter segment for each color of said color ratio, each said filter segment having a wavelength range that permits specified wavelengths to pass;

measuring power of said source light for each color of said power ratio, as transmitted through all filter segments of said color wheel corresponding to said each color, thereby obtaining a power value for each color;

comparing said power value for each color to said power ratio, thereby determining an out-of-balance color;

adjusting the relative sizes of said filter segments of said color wheel to partially compensate said out-of-balance color;

adjusting said display times for said pixel data for each color by an amount of time proportional to the adjustment to said relative size of said at least one filter segment corresponding to that color; and adjusting said wavelength range of one or more filter segments of said color wheel to compensate for said out-of-balance color.

13. The method of claim 12, wherein said out-of-balance color is deficient, and wherein said step of adjusting said wavelength range is performed by expanding said wavelength range of one or more filter segments corresponding to said out-of-balance color.

14. The method of claim 12, wherein said out-of-balance color is deficient, and wherein said step of adjusting said wavelength range is performed by contracting said wavelength range of one or more filter segments corresponding to a color not out-of-balance.

15. The method of claim 12, wherein said out-of-balance color is excessive, and wherein said step of adjusting said wavelength range is performed by contracting said wavelength range of one or more filter segments corresponding to said out-of-balance color.

16. The method of claim 12, wherein said out-of-balance color is excessive, and wherein said step of adjusting said wavelength range is performed by expanding said wavelength range of one or more filter segments corresponding to a color not out-of-balance.

17. The method of claim 12, wherein said out-of-balance color is deficient and wherein said step of adjusting the relative sizes of said filter segments is performed by increasing said size of one or more filter segments corresponding to said out-of-balance color.

18. The method of claim 12, wherein said out-of-balance color is excessive and wherein said step of adjusting the relative sizes of said filter segments is performed by decreasing said size of one or more filter segments corresponding to said out-of-balance color.

* * * * *